Patented Oct. 21, 1952

2,615,025

UNITED STATES PATENT OFFICE 2,615,025

PROCESS FOR THE PREPARATION OF ETHYLENE UREA

Leland J. Lutz, Grand Island, N. Y., assignor to Mathieson Chemical Corporation, a corporation of Virginia No Drawing. Application October 18, 1951, Serial No. 252,007

6 Claims. (Cl. 260—309.7)

My invention relates to the manufacture of ethylene urea and more particularly to its manufacture from carbonyl sulfide at atmospheric pressures and relatively low temperatures.

The present manufacture of ethylene urea is accomplished by reacting carbon dioxide and ethylene diamine at pressures of 10 to 1000 atmospheres and temperatures of 175° to 300° C. The carbonyl group may be derived from other sources than carbon dioxide such as urea, ammonium carbonate, ethyl carbonate, and phosgene. The ethylene radical also may be obtained from ethanolamine, ethylene glycol, ethylene oxide and ethylene dichloride. These processes in general involve high pressures and temperatures with corresponding disadvantages in cost and difficulties of operation.

I have found that ethylene urea may be produced in excellent yields by the reaction of carbonyl sulfide and ethylene diamine in a solvent. I have further found that the reaction is best conducted in the presence of volatile, non-reactive organic solvent. Under these conditions, the process may be operated at atmospheric pressure and at moderate temperatures so that distinct advantages are obtained in terms of capital investment, operating costs, and ease of operation compared to conventional processing. I have also found that methanol is a particularly suitable solvent. Other useful oxygen containing solvents are ethanol, isopropanol, ether and acetone. Other volatile, non-reactive organic solvents which may be used include benzene, toluene and petroleum ether. It is important that the solvent be easily removed by heating at moderate temperatures.

According to my invention, I react ethylene diamine and carbonyl sulfide in approximately equimolecular proportions in the solvent at atmospheric pressure and at temperatures between room temperature and about 135° C. The reactants may be brought together in a suitable solvent to any desired manner. I have found it convenient to prepare a solution of ethylene diamine in methanol, or any other suitable solvent, and to pass carbonyl sulfide gas into this solution or alternatively, a solution of carbonyl sulfide in methanol or other solvent may be admixed with the solution of ethylene diamine. An intermediate reaction product is formed instantaneously and is precipitated from solution. After addition of about the theoretical quantity of carbonyl sulfide, I remove the precipitated intermediate reaction product by any suitable means, such as filtration or decantation, and wash it with fresh solvent. I then heat the intermediate compound, which may be first dried at low temperature or may be wet with solvent, to about 110°–135° C. to remove hydrogen sulfide and any residual solvent. The loss of hydrogen sulfide from the intermediate is substantially quantitative and the yields of ethylene urea are nearly quantitative.

The intermediate appears to have the composition shown as the product in equation (1). It is probably decomposed by heating according to equation (2) to form ethylene urea and hydrogen sulfide:

(1)

(2)
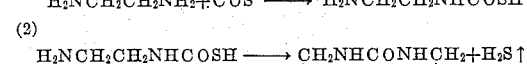

The process of my invention may be operated with advantage continuously. In this method of conducting my invention, ethylene diamine and carbonyl sulfide together with solvent are charged to a reaction vessel. The solvent may be charged separately or with either or both of the reactants. As the reaction is very rapid, the reactants may be charged continuously and a slurry of crystals is removed with the solvent from the bottom of the reaction vessel and charged to a continuous rotary filter. The filtrate is recycled directly to the reaction vessel or used to dissolve the reactants before they are charged to the reaction vessel. If desired, the recycled solvent may be purified, for example, by distillation, to remove polysulfide byproducts before it is recharged to the reaction zone. The solid product from the continuous rotary filter is charged to a dryer equipped to recover solvent and then to a heated decomposition tank where hydrogen sulfide is removed and the ethylene urea is obtained as a melt from the bottom.

The following examples illustrate the operation of my invention without intention, however, of limiting the operation to the particular process described.

Example I 24 gms. (0.2 mol) of ethylene diamine was dissolved in 200 ml. of methanol and 0.2 mol of carbonyl sulfide gas was passed into the solution. The mixture warmed itself but not enough heat was evolved to make the solution boil. In about 15 minutes all the carbonyl sulfide had been added and the solution was filtered. The white precipitate was washed with acetone.

The solid was heated to 110°–120° C. until the evolution of hydrogen sulfide ceased. Nitrogen was passed over the reaction mixture to assist in the removal of hydrogen sulfide and to prevent air oxidation. The product obtained as a melt at 120°–124° C. was cooled, ground and found to have a melting point of 124° C. The analysis for carbon, hydrogen and nitrogen agreed very closely with theoretical values for ethylene urea. The yield was nearly quantitative.

*Example II*

30.2 gms. of a 77.1% aqueous solution of ethylene diamine was dissolved in 100 ml. of ethanol and the theoretical amount of carbonyl sulfide was passed into the solution. The solid removed by filtration was heated to a temperature of 131° C. until no more hydrogen sulfide was evolved. The crude melt comprised 30.9 gms. of material and represented a 93% yield. Recrystallized from ethanol using a decolorizing charcoal, a product was obtained having a melting point of 128°–130° C.

I claim:

1. A process for the manufacture of ethylene urea which comprises reacting carbonyl sulfide and ethylene diamine in a volatile, non-reactive, organic solvent, separating a solid intermediate reaction product from the reaction mixture and recovering a solid residue of ethylene urea from the intermediate product by heating.

2. The process according to claim 1 wherein the intermediate reaction product is formed at atmospheric pressure and temperature.

3. The process according to claim 1 wherein the volatile, non-reactive, organic solvent is oxygen containing.

4. The process according to claim 3 wherein the volatile, non-reactive, oxygen containing, organic solvent is a low boiling aliphatic alcohol.

5. The process according to claim 4 wherein the volatile, non-reactive, oxygen containing, organic solvent is methanol.

6. A process for the manufacture of ethylene urea which comprises continuously reacting carbonyl sulfide and ethylene diamine in a volatile, non-reactive, organic solvent in a reaction zone, continuously removing a reaction mixture from the reaction zone, separating a solid intermediate reaction product and the solvent from the reaction mixture, returning the solvent to the reaction zone, and heating the intermediate product to recover a solid residue of ethylene urea.

LELAND J. LUTZ.

No references cited.